United States Patent
Williams et al.

(10) Patent No.: US 12,522,033 B2
(45) Date of Patent: Jan. 13, 2026

(54) PIVOTING TOW HOOK ASSEMBLIES AND VEHICLES INCLUDING SAME

(71) Applicant: Toyota Motor Engineering & Manufacturing North America, Inc., Plano, TX (US)

(72) Inventors: Paxton S. Williams, Milan, MI (US); Adam D. Holmstrom, Pinckney, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 558 days.

(21) Appl. No.: 17/973,062

(22) Filed: Oct. 25, 2022

(65) Prior Publication Data

US 2024/0131882 A1 Apr. 25, 2024
US 2024/0227472 A9 Jul. 11, 2024

(51) Int. Cl.
*B60D 1/167* (2006.01)
*B60D 1/50* (2006.01)
*B60D 1/56* (2006.01)

(52) U.S. Cl.
CPC .............. *B60D 1/1675* (2013.01); *B60D 1/50* (2013.01); *B60D 1/565* (2013.01)

(58) Field of Classification Search
CPC ......... B60D 1/1675; B60D 1/50; B60D 1/565
See application file for complete search history.

(56) References Cited

U.S. PATENT DOCUMENTS

| 2,371,662 | A | * | 3/1945 | Winters | B60D 1/50 |
|||||| 280/506 |
| 3,868,098 | A | * | 2/1975 | Coombs | B60D 1/50 |
|||||| 280/487 |
| 4,157,838 | A | | 6/1979 | von Allworden | |
| 7,216,904 | B2 | | 5/2007 | Thomas | |
| 7,472,919 | B2 | | 1/2009 | Pratt et al. | |
| 7,753,396 | B2 | | 7/2010 | Jamieson et al. | |
| 7,775,546 | B2 | | 8/2010 | Asjad | |
| 8,371,602 | B1 | | 2/2013 | Peschansky et al. | |
| 9,114,679 | B2 | | 8/2015 | Hood et al. | |
| 9,499,020 | B2 | * | 11/2016 | Degenkolb | B60D 1/565 |
| 10,457,104 | B2 | | 10/2019 | Shenaq et al. | |
| 10,464,382 | B2 | * | 11/2019 | Ghannam | B60D 1/167 |

(Continued)

FOREIGN PATENT DOCUMENTS

| CN | 201264493 Y | 7/2009 |
| CN | 202345319 U | 7/2012 |
| CN | 103434351 A * | 12/2013 |

(Continued)

*Primary Examiner* — Faye M Fleming
(74) *Attorney, Agent, or Firm* — Dinsmore & Shohl LLP

(57) ABSTRACT

A tow hook assembly coupled to the cross member of a vehicle. The tow hook assembly includes a housing, a tow hook, and a biasing member. The tow hook is pivotally coupled to the housing and positionable between an extended position and a retracted position. The biasing member is coupled to the tow hook and the housing to bias the tow hook towards the extended position. The tow hook is configured to pivot from the extended position towards the retracted position upon application of a force exceeding a threshold applied to the tow hook.

11 Claims, 4 Drawing Sheets

(56) References Cited

U.S. PATENT DOCUMENTS 10,933,706 B2    3/2021   Shenaq et al.
10,960,717 B2    3/2021   Adachi et al.

FOREIGN PATENT DOCUMENTS

| DE | 202015105094 U1 | * | 12/2015 | ............... B60D 1/50 |
| DE | 102018114518 A1 | * | 1/2019 | ............... B61G 5/04 |
| EP | 3733432 A1 | * | 11/2020 | ............... B60D 1/04 |
| EP | 3415398 B1 | * | 8/2021 | ............... B60D 1/04 |
| FR | 2776240 A1 | | 6/2000 | |
| JP | 2007237867 A | | 9/2007 | |
| KR | 19990002807 U | * | 6/1997 | ............... B60D 1/50 |

* cited by examiner

PIVOTING TOW HOOK ASSEMBLIES AND VEHICLES INCLUDING SAME

TECHNICAL FIELD

The present specification generally relates to tow hooks for vehicles and, more specifically, a pivotable tow hook that reduces impact with an object or person during a vehicle front end collision.

BACKGROUND

To tow a vehicle in the event of an accident, malfunction, loss of gas, or being stuck in mud or snow, tow hooks are provided at specific locations of a frame of the vehicle to tow the vehicle without damage. Tow hooks are typically mounted on a front rail of the vehicle and may extend through apertures formed in a front bumper of the vehicle to project outwardly therefrom. Alternatively, tow hooks may project from beneath the front bumper. The tow hooks may be positioned and painted to maintain an aesthetically pleasing appearance of the vehicle.

Tow hooks are typically formed from a rigid material to withstand large forces when being towed and to remain secured to the vehicle itself. As such, the tow hooks may result in an impact with a barrier during a front end collision such as with, for example, a pedestrian's leg or knee.

Accordingly, a need exists for an improved vehicle with a tow hook that pivots out of contact with a barrier during a front end collision.

SUMMARY

In one embodiment, a vehicle includes a cross member and a tow hook assembly coupled to the cross member. The tow hook assembly includes a housing, a tow hook, and a biasing member. The tow hook is pivotally coupled to the housing and positionable between an extended position and a retracted position. The biasing member is coupled to the tow hook and the housing to bias the tow hook towards the extended position. The tow hook is configured to pivot from the extended position towards the retracted position upon application of a force exceeding a threshold applied to the tow hook.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
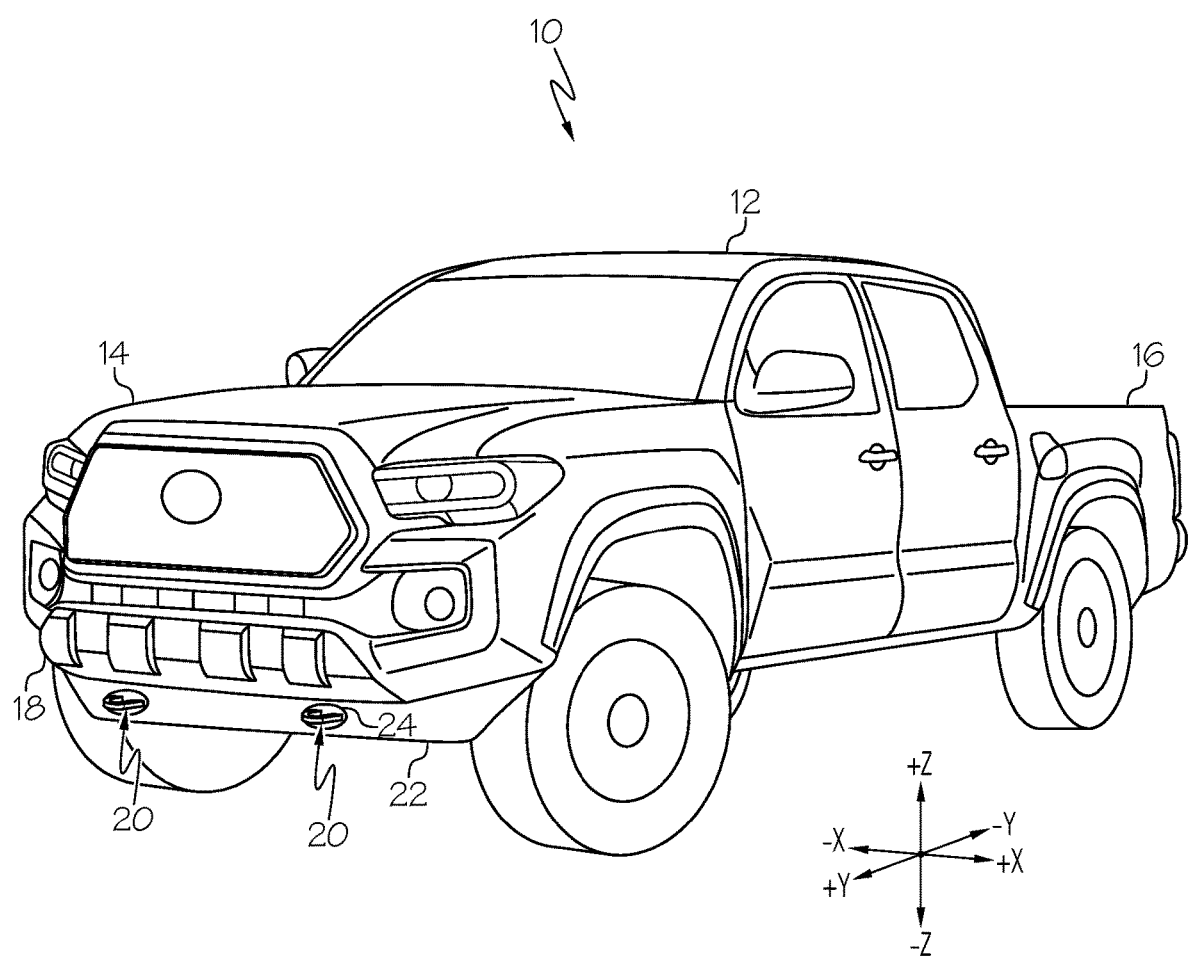
FIG. 1 schematically depicts a perspective view of a vehicle including a pair of tow hook assemblies, according to one or more embodiments shown and described herein.

Embodiments described herein are directed to vehicles that include a pivotable tow hook such that the tow hook pivots upon a low energy impact to a barrier, such as a person or object, to an impact force against the barrier from an extended position to a retracted position and automatically returns to the extended position after the barrier is no longer contacted to maintain an aesthetic appearance and usability of the tow hook.

The vehicles described herein include a cross member and a tow hook assembly coupled to the cross member. The tow hook assembly includes a housing defining an interior, a tow hook, a fastener, and a biasing member. The tow hook, having a leading portion, extends partially within the interior of the housing and is positionable between the extended position and a retracted position. The fastener extends through the housing and the tow hook, and the biasing member encircles the fastener to bias the tow hook toward the extended position. When a force exceeding a threshold is applied to the leading portion of the tow hook, the tow hook pivots from the extended position to the retracted position. Various embodiments of the vehicle and the operation of the tow hook assembly are described in more detail herein. Whenever possible, the same reference numerals will be used throughout the drawings to refer to the same or like parts.

As used herein, the term "vehicle longitudinal direction" refers to the forward-rearward direction of the vehicle (i.e., in the +/−vehicle Y direction depicted in FIG. 1). The term "vehicle lateral direction" refers to the cross-vehicle direction (i.e., in the +/−vehicle X direction depicted in FIG. 1), and is transverse to the vehicle longitudinal direction. The term "vehicle vertical direction" refers to the upward-downward direction of the vehicle (i.e., in the +/−vehicle Z direction depicted in FIG. 1). As used herein, "upper" and "above" are defined as the positive Z direction of the coordinate axis shown in the drawings. As used herein, "lower" and "below" are defined as the negative Z direction of the coordinate axis shown in the drawings.

Referring to FIG. 1, a vehicle 10 is generally illustrated according to one or more embodiments described herein. As shown, the vehicle 10 is illustrated as a pickup truck. However, the vehicle 10 may be any suitable automobile including coupes, sedans, minivans, crossovers, hybrids, sports utility vehicles, or the like without limiting the scope of the present disclosure. The vehicle 10 includes a vehicle body 12 having a front end 14 and a rear end 16 opposite the front end 14, and a front bumper 18 having a bottom surface 22 provided at the front end 14 of the vehicle body 12 of the vehicle 10.

The vehicle 10 includes one or more tow hook assemblies 20 located at the front end 14 of the vehicle body 12 of the vehicle 10. For example, as depicted herein, the vehicle 10 includes a pair of tow hook assemblies 20 mounted to extend through an opening 24 in the front bumper 18 at the front end 14 of the vehicle 10. However, it should be appreciated that the vehicle 10 may include any number of tow hook assemblies 20, such as one tow hook assembly 20 or more than two tow hook assemblies 20. In addition, the tow hook assembly 20 may be mounted at any suitable location of the vehicle 10 such as, for example, at the bottom surface 22 of the front bumper 18, at the front end 14 of the vehicle 10, or to a cross member 34 (FIG. 2) of the vehicle 10 located in a rearward vehicle longitudinal direction of the front bumper 18.

Figure 2:
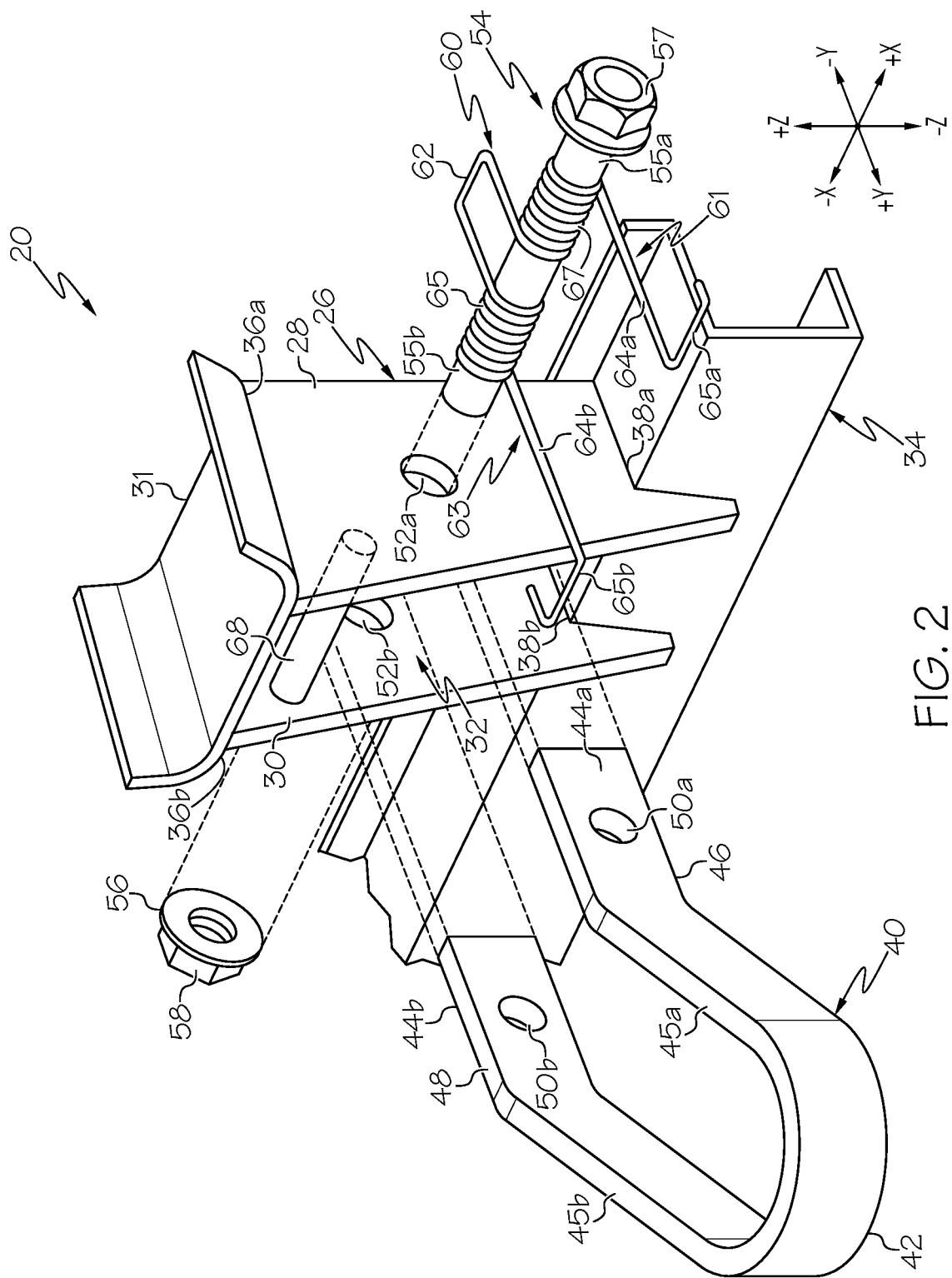
FIG. 2 schematically depicts a exploded, perspective view of the tow hook assembly of FIG. 1, according to one or more embodiments shown and described herein.

Referring now to FIG. 2, an exploded view of the tow hook assembly 20 mounted to a cross member 34 is shown. In embodiments, the cross member 34 extends in the vehicle lateral direction (in the +/−X direction of the coordinate axes depicted in the drawings). A plurality of tow hook assemblies 20 may be coupled to the cross member 34. In some embodiments, the cross member 34 may be a bumper beam, a front side member, or a frame member of the vehicle 10. The tow hook assembly 20 generally includes a housing 26, a tow hook 40, a fastener 54, and a biasing member 60.

The housing 26 includes a first side wall 28 having an upper end 36a and a lower end 38a, and a second side wall 30 having an upper end 36b and a lower end 38b opposite the first side wall 28. The housing 26 also includes a top wall 31 extending between the upper end 36a of the first side wall 28 and the upper end 36b of the second side wall 30. The first side wall 28, the second side wall 30, and the top wall 31 cooperate to define an interior 32 of the housing 26. Apertures 52a, 52b are formed in the first side wall 28 and the second side wall 30, respectively. In embodiments, the lower end 38a of the first side wall 28 and the lower end 38b of the second side wall 30 is fixed or otherwise coupled to the cross member 34. In some embodiments, the housing 26 may be fixed directly to the front bumper 18 (FIG. 1) itself rather than the cross member 34. In embodiments, a stopper 68 extends from at least one of the first side wall 28 and the second side wall 30. In some embodiments, the stopper 68 extends between the first side wall 28 and the second side wall 30 of the housing 26 in a position above the tow hook 40 in the vehicle vertical direction. The stopper 68 may be a pin, protrusion, bar, or the like. In other embodiments, the stopper 68 may be attached or otherwise coupled to one of the first side wall 28 and the second side wall 30 and extending toward the other of the first side wall 28 and the second side wall 30. In some embodiments, the stopper 68 is integrally formed as a one piece monolithic structure with the housing 26.

The tow hook 40 includes a first end portion 44a, a second end portion 44b opposite the first end portion 44a, and a leading portion 42 extending between the first end portion 44a and the second end portion 44b. The first end portion 44a, the second end portion 44b, and the leading portion 42 cooperate to form a U-shape. Apertures 50a, 50b are formed in the first end portion 44a and the second end portion 44b, respectively. The tow hook 40 further has a top surface 48 and a bottom surface 46 opposite the top surface 48. The tow hook 40 includes a first bend 45a formed at a location at which the first end portion 44a is joined to the leading portion 42, and a second bend 45b formed at a location at which the second end portion 44b is joined to the leading portion 42. Accordingly, the leading portion 42 of the tow hook 40 extends at an oblique angle from the first end portion 44a and the second end portion 44b due to the first bend 45a and the second bend 45b such that the leading portion 42 is positioned vertically offset below the first end portion 44a and second end portion 44b of the tow hook 40.

In embodiments, the tow hook assembly 20 includes a fastener 54 having a first end 55a and an opposite second end 55b that pivotally secures the tow hook 40 to the housing 26. In some embodiments, the fastener 54 is a threaded fastener that is secured by a washer 56 and nut 58 on the second end 55b of the fastener 54 extending through the second side wall 30 and the fastener 54 has a head 57 formed at a first end 55a opposite the second end 55b of the fastener 54 to maintain the tow hook 40 on the housing 26. In embodiments, the fastener 54 may be a bolt, pin, or any other suitable fastening member that would allow the tow hook 40 to pivot when secured to the housing 26. It should be appreciated that, in embodiments, the fastener 54 may be welded, clipped, or otherwise coupled to the housing 26.

Figure 4:
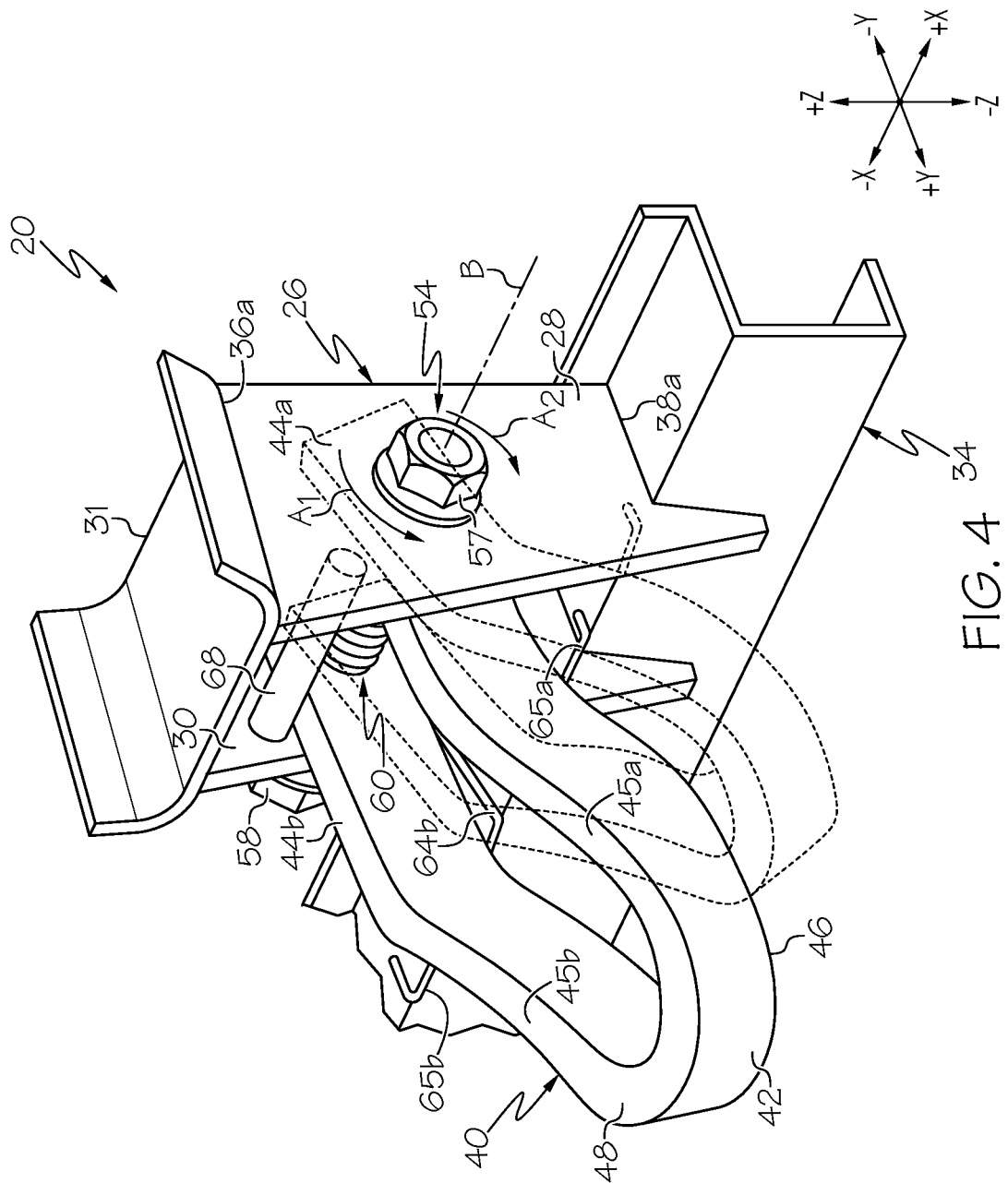
FIG. 4 schematically depicts a perspective view of the tow hook assembly of FIG. 1 in an extended position and a retracted, according to one or more embodiments shown and described herein.

Referring still to FIG. 2, a biasing member 60 engages with the tow hook 40 to bias the tow hook 40 towards an extended position as shown in solid lines in FIG. 4. In some embodiments, the biasing member 60 is a spring such as a torsion spring. Referring back to FIG. 2, the biasing member 60 at least partially encircles the fastener 54. The biasing member 60 includes a body 65 with a plurality of windings 67 encircling the fastener 54. In embodiments, the body 65 of the biasing member 60 may be a circular metal wire, or other like material, wrapped around the fastener 54. The biasing member 60 has a first end portion 61 and a second end portion 63 on opposite sides of the windings 67. The first end portion 61 and the second end portion 63 of the biasing member 60 includes a protruding end 64a, 64b, respectively, that extends toward the leading portion 42 of the tow hook 40 in the vehicle longitudinal direction. The protruding ends 64a, 64b extend a distance further than the first side wall 28 and the second side wall 30 of the housing 26 in the vehicle longitudinal direction. The first end portion 61 and the second end portion 63 of the biasing member 60 each include a bent portion 65a, 65b extending in a perpendicular direction from the protruding ends 64a, 64b to contact the bottom surface 46 of the tow hook 40, as described in more detail herein. The biasing member 60 further includes a connection portion 62 that extends rearward in a direction opposite the leading portion 42 of the tow hook 40 in the vehicle longitudinal direction at a general medial location of biasing member 60 between the plurality of windings 67.

Figure 3:
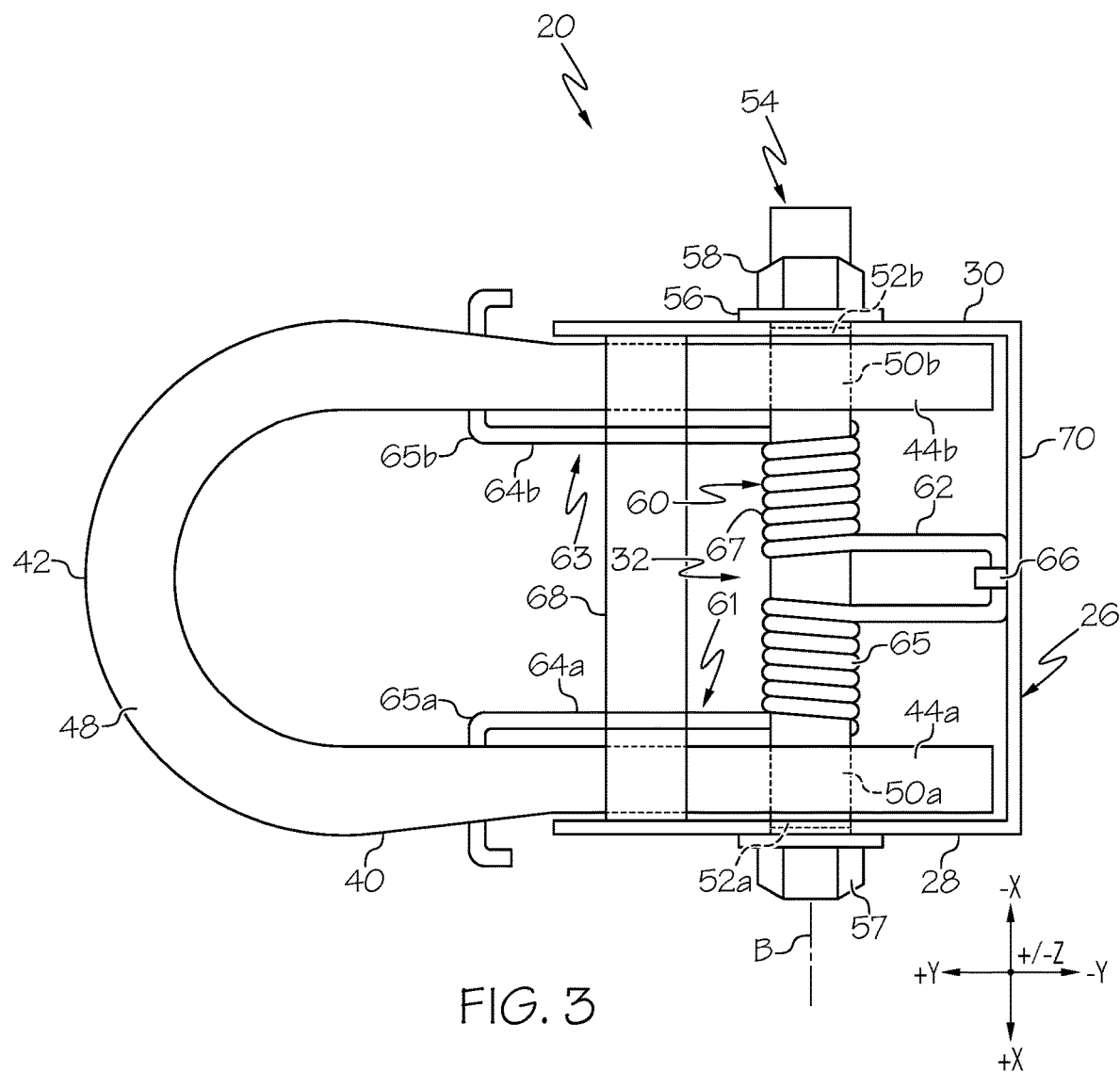
FIG. 3 schematically depicts top view of the tow hook assembly of FIG. 1, according to one or more embodiments shown and described herein.

Now referring to FIG. 3, a partial top view of the tow hook assembly 20, in an assembled state, is depicted with the top wall 31 omitted. In the assembled state, the first end portion 44a and second end portion 44b of the tow hook 40 extend into the interior 32 of the housing 26. The fastener 54 extends through the apertures 52a, 52b formed in the first side wall 28 and the second side wall 30 of the housing 26 and the apertures 50a, 50b formed in the first end portion 44a and the second end portion 44b of the tow hook 40 to pivotably fix the tow hook 40 to the housing 26 and permit the tow hook 40 to pivot about a pivot axis B extending in the vehicle lateral direction. In embodiments, the fastener 54 is secured on the housing 26 with the housing 26 positioned between the head 57 and the nut 58 of the fastener 54. The biasing member 60 is provided within the interior 32 of the housing 26 and encircles the fastener 54 between the first end portion 44a and the second end portion 44b of the tow hook 40. The protruding ends 64a, 64b of the fastener 54 extend outward towards the leading portion 42 of the tow hook 40 in the vehicle longitudinal direction. The bent portions 65a, 65b extend perpendicularly from the protruding ends 64a, 64b of the biasing member 60 abut against the bottom surface 46 (FIG. 2) of the tow hook 40 to damp the pivoting of the tow hook 40 in the downward vehicle vertical direction. In embodiments, the biasing member 60 biases the tow hook 40 in the direction of arrow A2 such the top surface 48 of the tow hook 40 abuts against the stopper 68 in the extended position to prevent the tow hook 40 form pivoting upward in the vehicle vertical direction around the B axis.

In embodiments, the housing 26 further comprises a rear wall 70. The rear wall 70 extends between the first side wall 28 and the second side wall 30 of the housing 26 to create a U-shape. The rear wall 70 of the housing 26 includes an attachment member 66 that couples the biasing member 60, specifically, the connection portion 62, to the housing 26. In some embodiments, the attachment member 66 extend a forward vehicle longitudinal direction from the rear wall 70 toward the biasing member 60. In embodiments, the attachment member 66 is provided at a vertical location substantially equal to a vertical location of the apertures 52a, 52b in the first side wall 28 and the second side wall 30 in the vehicle vertical direction. In embodiments, the attachment member 66 may be provided at a substantially center location of the rear wall 70 of the housing 26 in the vehicle lateral direction and corresponding to a location of the connection portion 62 of the biasing member 60 in the vehicle lateral direction. However, it should be appreciated that the attachment member 66, as well as the connection portion 62 of the biasing member 60 may be provided at any suitable location in the vehicle lateral direction along the length of the rear wall 70 and the biasing member 60, respectively. As shown in FIG. 3, the connection portion 62 of the biasing member 60 abuts the attachment member 66 of the rear wall 70. Specifically, the connection portion 62 is positioned below the attachment member 66 in the vehicle longitudinal direction such that the attachment member 66 prevents upward vertical movement of the connection portion 62 during the pivoting of the tow hook 40, as discussed in more detail herein.

Referring now to FIG. 4, a perspective view of the tow hook assembly 20 is shown with the tow hook 40 in an extended or use position, in solid lines, and a retracted or folded position, in dashed lines. As described in more detail herein, the tow hook 40 pivots from the extended position to the retracted position in the direction of arrow A1 about axis B upon application of a predetermined force that is greater than a biasing force provided by the biasing member 60. Similarly, the tow hook 40 pivots from the retracted position to the extended position in the direction of arrow A2 about axis B opposite the direction of arrow A1. When the tow hook 40 is in the extended position, the leading portion 42 is at a first position in a vehicle vertical direction, the tow hook 40 extending out in the vehicle longitudinal direction. In the extended position, the protruding ends 64a, 64b of the biasing member 60 apply a force against the bottom surface 46 of the tow hook 40 to bias the tow hook 40 in the vehicle vertical direction. In the extended position, the the top surface 48 of the tow hook 40 is biased against the stopper 68 to prohibit the tow hook 40 from over-pivoting past the extended position in the direction of arrow A2.

In the retracted position, the tow hook 40 is pivoted axially downward in the direction of arrow A1 about the B axis in the vehicle vertical direction into a second position. The leading portion 42 of the tow hook 40 in the second position is lower in the vehicle vertical direction than the first position. In use, the tow hook 40 moves from the extended position to the retracted position upon an application of force exceeding a threshold against the leading portion 42 of the tow hook 40 in the rearward direction towards the housing 26 in the vehicle longitudinal direction. As described herein, the leading portion 42 of the tow hook 40 is positioned forward and below the first end portion 44a and second end portion 44b of the tow hook 40. Therefore, when the force is applied to the leading portion 42, the tow hook 40 pivots in the direction of arrow A1 about the B axis.

In embodiments, the protruding ends 64a, 64b of the biasing member 60 absorbs a force applied to the tow hook 40 and moves the tow hook 40 from the extended position to the retracted position. In embodiments, the connection portion 62 of the biasing member 60 engages with the attachment member 66 to restrict rotation of the connection portion 62 about the B axis. When the force acting upon the leading portion 42 of the tow hook 40 is no longer applied, or does not exceed the biasing force of the biasing member 60, the protruding ends 64a, 64b of the biasing member 60 apply a biasing force against the bottom surface 46 of the tow hook 40 to return the tow hook 40 from the retracted position to the extended position. As such, when the tow hook 40 is in the extended position, the tow hook 40 may be used to tow the vehicle 10 (FIG. 1). Alternatively, when the tow hook 40 is in the retracted position, the tow hook 40 may be pivoted out of contact with a barrier during a collision to the front end 14 of the vehicle 10 to reduce a likelihood of impact with the barrier or at least a force applied against the barrier.

To facilitate a better understanding, the operation of the tow hook assembly 20 will be briefly described. Upon a force meeting a predetermined threshold applied to the leading portion 42 of the tow hook 40 in the extended position, the force of the predetermined threshold being greater than the biasing force provided by the biasing member 60, the force overcomes the biasing force provided by the biasing member 60 causing the tow hook 40 to pivot from the extended position to the retracted position. When the biasing force provided by the biasing member 60 is greater than the force applied to the leading portion 42 of the tow hook 40, the tow hook 40 will pivot from the retracted position to the extended position.

From the above, it is to be appreciated that defined herein is a vehicle with a tow hook that pivots upon an impact to reduce an impact force against a barrier such as, for example, a pedestrian or other object, but permitting the tow hook to pivot back to an original position once a force is no longer applied against a leading portion of the tow hook.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A tow hook assembly coupled to a cross member, the tow hook assembly comprising:
   a housing;
   a tow hook pivotally coupled to the housing and positionable between an extended position and a retracted position; and
   a biasing member coupled to the tow hook and the housing to bias the tow hook towards the extended position, the tow hook configured to pivot from the extended position towards the retracted position upon application of a force exceeding a threshold applied to the tow hook.

2. The tow hook assembly of claim 1, wherein the tow hook further comprises a first end portion and a second end portion opposite a leading portion, and when the tow hook is in the extended position, the leading portion is at a first position in a vehicle vertical direction and when the tow hook is in the retracted position, the leading portion is at a second position in the vehicle vertical direction lower than the first position.

3. The tow hook assembly of claim 1, further comprising a front bumper, wherein the front bumper includes an opening for housing the tow hook and an aperture formed such that the tow hook can move through the aperture.

4. The tow hook assembly of claim 1, further comprising a front bumper having a bottom surface, wherein the tow hook assembly is coupled to the bottom surface of the front bumper.

5. The tow hook assembly of claim 1, wherein the housing comprises a first side wall and a second side wall, and the tow hook further comprises a first end portion and a second end portion opposite a leading portion, wherein a fastener extends through apertures formed on the first side wall and the second side wall of the housing and the first end portion and the second end portion of the tow hook.

6. The tow hook assembly of claim 5, further comprising a stopper coupled to the housing between the first side wall and the second side wall, wherein
- when the tow hook is in the extended position, the leading portion is at a first position in a vehicle vertical direction, and
- the stopper engages the tow hook when in the extended position to prohibit movement of the leading portion of the tow hook past the first position in the vehicle vertical direction.

7. The tow hook assembly of claim 6, wherein the stopper is attached to and extends between the first side wall and the second side wall of the housing.

8. The tow hook assembly of claim 1, wherein the housing further comprises a rear wall having an attachment member extending toward the tow hook in a vehicle longitudinal direction.

9. The tow hook assembly of claim 8, wherein the biasing member includes a connection portion, the connection portion engaging with the attachment member as to limit rotation of the connection portion in a vehicle vertical direction extending perpendicular to the vehicle longitudinal direction.

10. The tow hook assembly of claim 1, wherein the biasing member is a torsion spring.

11. The tow hook assembly of claim 1, wherein the tow hook pivots about an axis between the extended position and the retracted position, the axis extending in a vehicle lateral direction.

* * * * *